United States Patent [19]

Jernigan et al.

[11] 4,176,167
[45] Nov. 27, 1979

[54] PROCESS FOR CONVERTING ALKALI METAL IODATES TO PERIODATES

[75] Inventors: Robert T. Jernigan; Byford D. Sheffield, both of Lake Jackson, Tex.

[73] Assignee: The Dow Chemical Company, Midland, Mich.

[21] Appl. No.: 834,608

[22] Filed: Sep. 19, 1977

[51] Int. Cl.$^2$ .............................................. C01B 11/22
[52] U.S. Cl. ..................................................... 423/476
[58] Field of Search ................................. 423/476, 462

[56] References Cited

U.S. PATENT DOCUMENTS 2,989,371   6/1961   Mehltretter et al. ................. 423/476

FOREIGN PATENT DOCUMENTS 79005   1/1971   Fed. Rep. of Germany ........... 423/476

OTHER PUBLICATIONS

"Periodic Acid and Iodic Acid and Their Salts" by G. F. Smith, 5th Ed., Rev., 1950, pp. 7-13, pub. by G. F. Smith Chem. Co., Col., Ohio.
"Sodium Orthoperiodate" by E. Zintl et al., Z. Anorg. Allgem. Chem., vol. 245, pp. 20-25, 1940 (English Translation).
Inorganic Synthesis, vol., pp. 168-175.
Hackh's Chem. Dictionary, 4th Ed., Revised, 1969, by Julius Grant, p. 71, McGraw-Hill Book Co., N.Y.

*Primary Examiner*—O. R. Vertiz
*Assistant Examiner*—Thomas W. Roy
*Attorney, Agent, or Firm*—J. G. Carter

[57] ABSTRACT

Alkali metal iodates are converted to the corresponding periodate by contacting the iodate with a hydroxide of the same or different alkali metal and an oxygen containing gas at temperatures of from 150° C. to 600° C.

7 Claims, No Drawings

PROCESS FOR CONVERTING ALKALI METAL IODATES TO PERIODATES

BACKGROUND OF THE INVENTION

1. Field of the Invention

The present invention concerns a process for preparing alkali metal periodates from alkali metal iodates.

2. Description of the Prior Art

Alkali metal periodates have been prepared in the prior art by the following methods.

1. The treatment of periodic acid with an alkali metal hydroxide. The periodic acid is conveniently prepared by the electrolytic oxidation of iodine.

2. Sodium iodide can be converted to sodium periodate by reacting the iodide with sodium oxide in the presence of oxygen.

3. Sodium iodide can also be converted to sodium periodate by reacting the iodide with sodium hydroxide in the presence of oxygen.

4. Sodium iodate can be converted to the periodate by contacting the iodate with sodium hydroxide in the presence of chlorine or bromine.

Periodates when in the mono-or dibasic form readily oxidize propylene to its various oxidation forms including propylene oxide thereby converting the periodate to the iodate. It is therefore desirable to provide a method for converting the iodate to the periodate so that it can be employed to oxidize propylene. Such a process for oxidizing propylene and other olefins is described in copending application Ser. No. 834,609, now U.S. Pat. No. 4,120,877 by William P. Coker and Robert E. Lane, Jr. titled "OXIDATION OF OLEFINS TO OXIRANE COMPOUNDS WITH PERIODATE COMPOUNDS" filed simultaneously herewith (Sept. 19, 1977)

While the periodate compounds prepared herein by the present invention are in the tri-, tetra- or pentabasic state which are ineffective in oxidizing olefins to the corresponding epoxide, another copending application Ser. No. 834,610, now U.S. Pat. No. 4,134,967 by James E. Hillis and William P. Coker titled "PROCESS FOR PREPARING ALKALI METAL MONO- AND DIBASIC PERIODATES" filed simultaneously herewith (Sept. 19, 1977) provides a method for converting the tri-, tetra-, or pentabasic periodates to the mono- or dibasic state which are effective in oxidizing olefins.

SUMMARY OF THE INVENTION

The present invention is directed to a process for preparing alkali metal periodates by contacting an alkali metal iodate with an alkali metal hydroxide which can be the same as or different from the alkali metal of the iodate or mixture of alkali metal hydroxides in the presence of at least a stoichiometric quantity of oxygen at a temperature of from about 150° C. to about 600° C.

DESCRIPTION OF THE PREFERRED EMBODIMENTS

For the purposes of the invention described herein, the term "iodate" means an inorganic radical containing iodine and oxygen wherein the iodine is in the +5 valence state. The term periodate means an inorganic radical containing iodine and oxygen wherein the iodine is in the +7 valence state.

Suitable alkali metal iodates which are suitably employed in the process of the present invention include, for example, sodium iodate, potassium iodate, cesium iodate, rubidium iodate, lithium iodate and mixtures thereof.

When employed with another alkali metal iodate, cesium iodate acts as a catalyst in the conversion of the iodate to the periodate.

Suitable alkali metal hydroxides which are suitably employed in the process of the present invention include, for example, sodium hydroxide, lithium hydroxide, potassium hydroxide, rubidium hydroxide, cesium hydroxide and mixtures thereof.

Cesium hydroxide acts as a catalyst when employed in combination with other alkali metal hydroxides.

The oxygen can be employed in its relatively pure form, or it can be employed as a mixture with inert gases such as air, for example.

The ratio of the alkali metal hydroxide to the alkali metal iodate is usually from about 0.5:1 to about 10:1, preferably from about 2:1 to about 5:1.

The time, of course, like all chemical reactions is dependent upon the temperature employed.

At higher temperatures, shorter reaction times are required whereas at lower temperatures, longer reaction times are required. The time is usually from about 5 minutes to about 20 hours, preferably from about 5 minutes to about two hours.

The reaction can be conducted in the presence of up to about 100 moles, preferably less than about 75 moles of water per mole of alkali metal iodate. It is usually most desirable to conduct the reaction under substantially anhydrous conditions, i.e., in the absence of any water except for that normally present in the reactants.

While it has not been proven unequivocably, it is believed that the alkali metal periodates formed herein are in the tribasic, tetrabasic or pentabasic form since they are not effective in oxidizing propylene to propylene oxide.

The iodate ion can be represented by the formula $^-IO_3$. The periodate ion in the tribasic form can be represented by the formula $^{-3}H_2IO_6$. The periodate ion in the pentabasic form can be represented by the formula $^{-5}IO_6$.

Likewise, the corresponding alkali metal iodates and periodates can be represented by the formula $MIO_3$, $M_3H_2IO_6$ and $M_5IO_6$; wherein M is an alkali metal.

The following examples are exemplary of the present invention and are not to be construed as to limiting the scope thereof in any manner.

In the following examples, the iodate and periodate concentrations were determined by standard methods of analysis described in D. A. Skoog and D. M. West, "FUNDAMENTALS OF ANALYTICAL CHEMISTRY", 471, 474, 475, New York, Holt, Rinehart and Winston, 1963 and in H. A. Laitinen, "CHEMICAL ANALYSIS AN ADVANCED TEXT AND REFERENCE", 439, New York: McGraw-Hill, 1960.

The yield of periodate is based on the moles of periodate found per mole of iodate charged.

EXAMPLE 1

A mixture composed of 100 g $NaIO_3$ and 101 g NaOH was ground into a fine powder in a nitrogen filled dry box. This mixture was then transferred to a nickel beaker in a 1400 ml, 316 stainless steel autoclave which was sealed and pressurized to 1500 psig with oxygen. After being heated to 260° C. for 15 hours, the autoclave was allowed to cool to ambient at which time the excess oxygen was vented and the sample removed for analysis. This analysis showed that 76% of the iodate ($+^5I$) had been oxidized to periodate ($+^7I$).

EXAMPLE 2

Mixtures of NaOH and NaIO$_3$ in mole ratios of 1:1, 2:1, 3:1, 4:1, 5:1 and 10:1 were prepared by grinding the appropriate amounts of each together in a nitrogen filled dry box. Samples were weighed into nickel crucibles which were placed in a 1400 ml, 316 stainless steel autoclave. The autoclave was sealed, pressurized with 500 psig of oxygen and heated to 250°–340° C. for periods of from 1–20 hours. When cool, the excess oxygen was vented and the samples analyzed to determine the periodate yield.

The results are given in the following Table I.

TABLE I

| Moles NaOH per mole NaIO$_3$ | Temp. (°C.) | Time (hrs.) | Periodate Yield (%) |
|---|---|---|---|
| 1 | 280 | 5 | 13 |
| 2 | 250 | 5 | 32 |
| 2 | 300 | 1 | 36 |
| 2 | 300 | 2 | 44 |
| 2 | 300 | 5 | 50 |
| 2 | 305 | 20 | 47 |
| 2 | 340 | 5 | 50 |
| 3 | 300 | 2 | 70 |
| 3 | 300 | 5 | 68 |
| 4 | 250 | 5 | 80 |
| 4 | 300 | 1 | 60 |
| 4 | 300 | 2 | 73 |
| 4 | 300 | 5 | 84 |
| 4 | 305 | 20 | 84 |
| 4 | 340 | 5 | 92 |
| 5 | 295 | 4 | 91 |
| 5 | 300 | 2 | 98 |
| 5 | 300 | 5 | 96 |
| 5 | 340 | 5 | 98 |
| 10 | 300 | 5 | 100 |

EXAMPLE 3

Mixtures of NaOH and NaIO$_3$ were prepared in the manner described in Example 2; however, in this series of experiments, oxygen of atmospheric pressure continuously flowed through the autoclave. The results are given in the following Table II.

TABLE II

| moles NaOH per mole NaIO$_3$ | Temp. (°C.) | Time (hrs.) | Periodate Yield (%) |
|---|---|---|---|
| 2 | 295 | 4 | 44 |
| 3 | 295 | 4 | 63 |
| 4 | 295 | 4 | 73 |
| 5 | 295 | 4 | 91 |

EXAMPLE 4

Mixtures of NaOH and NaIO$_3$ were prepared in the manner described in Example 2; however, in this series of experiments air at atmospheric pressure continuously flowed through the autoclave. The results are given in the following Table III.

TABLE III

| moles NaOH per mole NaIO$_3$ | Temp. (°C.) | Time (hrs.) | Periodate Yield (%) |
|---|---|---|---|
| 2 | 300 | 5 | 60 |
| 3 | 300 | 5 | 82 |
| 4 | 300 | 5 | 96 |
| 5 | 300 | 5 | 96 |

EXAMPLE 5

Samples of 9.9 g NaIO$_3$ and 20.0 g NaOH* (1:10 mole ratio) were placed in a nickel beaker within a 1400 ml, 316 stainless steel autoclave. Various amounts of water were added to the mixture, the autoclave sealed, pressurized to 500 psig with oxygen and heated to about 300° C. for 5 hours. When cool, the excess oxygen was vented, solids collected and dried at 100° C. and analyzed for the formation of periodate. The results are given in the following Table IV.

*Commercially available NaOH contains about 1% water by weight.

TABLE IV

| Temp. (°C.) | moles water added per mole NaIO$_3$ | Periodate Yield (%) |
|---|---|---|
| 280 | 200 | 1 |
| 302 | 110 | 28 |
| 300 | 100 | 43 |
| 285 | 78 | 64 |
| 305 | 78 | 67 |
| 300 | 0 | 93 |

EXAMPLE 6

A mixture containing 8 moles of KOH per mole KIO$_3$ was placed in a nickel crucible in a 1400 ml, 316 stainless steel autoclave. The autoclave was sealed, flushed with oxygen and pressurized to 1300 psig with oxygen. After being heated to 300° C. for 16.5 hours, iodometric analysis of the product showed that 68% of the iodate had been oxidized to periodate. In a similar experiment with 4 moles of KOH per mole KIO$_3$ and a reaction time of 5 hours, 40% of the iodate was converted to periodate.

EXAMPLE 7

Samples of cesium iodate and cesium hydroxide having a mole ratio of 1:2 were weighed out in a dry atmosphere and placed in a nickel crucible in a 1400 ml, 316 stainless steel autoclave. The autoclave was sealed, pressurized with oxygen to 100 psig and heated to 150°–260° C. for one hour. When cool, the periodate was measured by a standard iodometric method. The results are given in the following Table V.

TABLE V

| Temp. (°C.) | Periodate Yield (%) |
|---|---|
| 150 | 35 |
| 170 | 50 |
| 210 | 77 |
| 260 | 92 |

EXAMPLE 8

A similar experiment to that of Example 7 employing oxygen at atmospheric pressure and a temperature of 300° C. for 5 hours gave a yield to periodate of 57%.

EXAMPLE 9

Mixtures of RbOH and RbIO$_3$ in the desired molar ratios were prepared by grinding the appropriate amounts of each compound together in a nitrogen filled dry box. A weighed amount of each mixture was placed in a nickel crucible in a 1400 ml, 316 stainless steel autoclave. The autoclave was pressurized with oxygen so that 1000 psig was obtained at the planned operating temperature. After being held at the reaction temperature for 5 hours, the autoclave was cooled and the contents of the crucibles analyzed for the amount of iodate remaining and periodate formed by the standard iodometric methods. The results are given in the following Table VI.

TABLE VI

| moles RbOH per mole RbIO$_3$ | Temp. (°C.) | Periodate Yield (%) |
|---|---|---|
| 1 | 195 | 40 |
| 1 | 285 | 36 |
| 2 | 285 | 61 |
| 4 | 285 | 83 |
| 8 | 195 | 54 |
| 8 | 285 | 71 |

EXAMPLE 10

Mixtures of KOH, KIO$_3$ and CsIO$_3$ in the desired molar ratio were prepared and ground together in a nitrogen filled dry box. Three to five grams of each mixture was placed in a nickel crucible within a 1400 ml, 316 stainless steel autoclave. The autoclave was sealed and pressurized with oxygen so that a pressure of 1000 psig was obtained at 200° C., the reaction temperature. After 5 hours reaction, the autoclave was cooled and the contents of each crucible analyzed by standard iodometric methods. The results are given in the following Table VII.

TABLE VII

| Molar Ratio | | | Periodate Yield (%) |
|---|---|---|---|
| KOH | KIO$_3$ | CsIO$_3$ | |
| 4 | 1.1 | 0 | 9 |
| 4 | 1 | 0.10 | 81 |
| 4 | 1 | 0.50 | 87 |

EXAMPLE 11

A similar experiment to that of Example 10 employing NaOH, NaIO$_3$ and CsOH in molar ratios of 4:1:0.075 gave a 53% yield of perioate after 5 hours at 200° C. and a pressure of 1000 psig oxygen (in the absence of added CsOH a 13% yield of periodate was obtained at 200° C.).

EXAMPLE 12

Mixtures of LiOH and LiIO$_3$ in various molar ratios were prepared and ground together in a nitrogen filled dry box. A 10 g sample of each mixture was placed in a nickel crucible within a 1400 ml, 316 stainless steel autoclave. The autoclave was sealed, pressurized with oxygen to 1000 psig and heated to 300° C. for 1.5 hours. Upon cooling the contents of each crucible was analyzed by standard iodometric methods. The results are given in the following Table VIII.

TABLE VIII

| moles LiOH per mole LiIO$_3$ | Periodate Yield (%) |
|---|---|
| 0.5 | 15 |
| 1 | 32 |
| 2 | 45 |
| 4 | 76 |

EXAMPLE 13

A binary hydroxide eutectic was prepared by grinding together equal molar amounts of NaOH and KOH. This mixture was then heated in a nickel beaker under a nitrogen purge until it had fused into a clear solution. The beaker of molten hydroxide eutectic melting point 170° C., was transferred to a nitrogen-filled dry box where it was allowed to cool and was then ground into a fine powder. A mixture composed of 10% KIO$_3$ (by weight) and 90% of the binary hydroxide eutectic was prepared and placed in a nickel crucible within a 1400 ml, 316 stainless steel autoclave. The autoclave was sealed, pressurized with oxygen to 500 psig and heated to 250° C. for 240 minutes. Upon cooling, standard iodometric analysis of the product indicated that 32% of the iodate had been oxidized to periodate.

EXAMPLE 14

A mixture with a mole ratio of 5 moles NaOH per mole of NaIO$_3$ was prepared and ground into a fine powder in a nitrogen filled dry box. A two gram portion was placed in a test tube which was then inserted into a constant temperature bath at 350° C. for 5 minutes. Analysis of the mixture upon cooling indicated that 34% of the iodate had been converted to periodate. A similar experiment having a reaction time of 10 minutes gave a 42% yield of periodate.

We claim:
1. A process for preparing one or more alkali metal periodates in the tri-, tetra- or pentabasic state from one or more alkali metal iodates which process comprises heating a mixture containing as components
    (1) an alkali metal iodate or mixture of such iodates,
    (2) an alkali metal hydroxide or mixture of such hydroxides in which the alkali metal portion of such hydroxide or mixtures thereof can be the same as or different from the alkali metal portion of said iodate or mixture thereof;
at a temperature of from about 150° C. to about 600° C. in the presence of at least a stoichiometric quantity of oxygen and less than about 100 moles of water per mole of alkali metal iodate and the molar ratio of component (2): component (1) is from about 0.5:1 to about 10:1.
2. The process of claim 1 wherein the mixture is heated in the presence of less than about 75 moles of water per mole of iodate.
3. The process of claim 2 wherein the mixture is heated under substantially anhydrous conditions and the mole ratio of component (2): component (1) is from about 2:1 to 5:1.
4. The process of claim 3 wherein the alkali metal portion of component 1 and 2 is lithium, potassium, sodium or mixtures thereof and the temperature is at least 250° C.
5. The process of claim 4 wherein the temperature is at least 300° C.
6. The process of claim 3 wherein the alkali metal portion of component (1) and (2) is cesium or a mixture containing cesium and the temperature is at least 200° C.
7. The process of claim 2 wherein the alkali metal portion of component (1) and (2) is rubidium or a mixture containing rubidium and the temperature is at least 195° C.

* * * * *

UNITED STATES PATENT AND TRADEMARK OFFICE
CERTIFICATE OF CORRECTION

PATENT NO. : 4,176,167
DATED : November 27, 1979
INVENTOR(S) : Robert T. Jernigan and Byford D. Sheffield It is certified that error appears in the above—identified patent and that said Letters Patent are hereby corrected as shown below:

Col. 6, line 51, before "5:1" the word ---about--- should be added.

Signed and Sealed this

Sixth Day of May 1980

[SEAL]

Attest:

SIDNEY A. DIAMOND

Attesting Officer

Commissioner of Patents and Trademarks